United States Patent [19]

Henning

[11] Patent Number: 5,067,271

[45] Date of Patent: Nov. 26, 1991

[54] IMPRISONING TRAP

[76] Inventor: Joergensen Henning, Noerrehald 4, Ebeltoft, Denmark

[21] Appl. No.: 571,596
[22] PCT Filed: Feb. 22, 1989
[86] PCT No.: PCT/DK89/00040
 § 371 Date: Aug. 30, 1990
 § 102(e) Date: Aug. 30, 1990
[87] PCT Pub. No.: WO89/07887
 PCT Pub. Date: Sep. 8, 1989

[30] Foreign Application Priority Data

Mar. 1, 1988 [DK] Denmark .............................. 1093/88
Nov. 17, 1988 [DK] Denmark .............................. 6430/88

[51] Int. Cl.⁵ ............................................ A01M 23/02
[52] U.S. Cl. ............................................ 43/60; 43/65;
 43/61; 43/67; 292/107; 292/129; 292/DIG. 72
[58] Field of Search ................... 43/61, 60, 64, 67, 65,
 43/66; 292/107, 209, 129, 229, DIG. 72

[56] References Cited

U.S. PATENT DOCUMENTS

| 1,138,132 | 4/1915 | Marsh | 43/66 |
| 1,142,781 | 6/1915 | Cameron | 43/66 |
| 1,415,093 | 5/1922 | Hurley | . |
| 1,801,821 | 4/1931 | Schiltz | . |
| 2,130,735 | 9/1938 | Goldsmith | 292/229 |
| 3,984,936 | 10/1976 | Camp | 43/66 |

FOREIGN PATENT DOCUMENTS 0018339 of 1911 United Kingdom ................... 43/61

Primary Examiner—Richard K. Seidel
Assistant Examiner—Patty E. Hong
Attorney, Agent, or Firm—Watson, Cole, Grindle & Watson

[57] ABSTRACT

A trap intended for capturing mice, rats, snakes or the like alive consists of a receptacle, preferably a household jar (6) and a cover (2,115). The cover (2,115) has an opening which is closed by a pivotally arranged grating (113). In order to manufacture a cover (2,115) which is readily adapted to various diameters and threads on the neck (7) of the receptacle (6) the connection means of the cover (2,115) are provided in the form of snap acting webs (4). So as to prevent a captured animal from escaping the cover comprises a stop latch (101) for holding the grating (113) into contact with the contact face on the cover.

6 Claims, 4 Drawing Sheets

IMPRISONING TRAP

BACKGROUND OF THE INVENTION

The present invention relates to a trap intended for capturing mice, rats, snakes or the like alive and comprising a transparent receptacle, preferably a household jar, and a cover which is releasably engaged with the receptacle and which comprises two support legs and a pivotally mounted grating intended for closing an entrance opening of the receptacle provided in the cover; the grating being in contact with a contact face when in its closed position; the contact face being arranged so that the trapped animal is unable to open the grating and escape, wherein the connecting means of the cover intended for engagement with the connecting means of the receptacle are provided for adaptation to slightly different diameters of the connecting means of the receptacle; the cover comprises means for holding the grating in contact with the contact face.

Traps for capturing mice or rats alive are known. Accordingly, a trap of the above-mentioned type is disclosed in U.S. Pat. No. 3,984,936. However, a trap made in accordance with this patent is associated with several drawbacks. For example, the grating may be opened from outside, whereby a captured animal may escape or be removed, e.g. by a cat. Moreover, if poison is used inside the receptacle, there is a risk of spreading the poison.

It is found that most household jars have an opening with a comparatively small number of standardized diameters being manufactured with a capacity within the range ¼-5 liter. As the connecting means of the cover is able to adapt to slightly different dimensions for the connecting means of the receptacle, it suffices to manufacture the closure in only 2-3 sizes in order for these to be adaptable to a majority of the household jars on the market.

SUMMARY OF THE INVENTION

It is the object of the present invention to remedy the above-mentioned drawbacks associated with the known traps and to provide a trap which is easy and inexpensive to manufacture, simple to use and which also provides a safe and humane retention of the trapped animal. According to the present invention this object is achieved with a trap characterized in that the holding means comprise a stop latch being at the one end provided with a serrated pawl intended for engagement with a locking hook provided on the grating and a substantially U-shaped flat spring which is made integrally with the stop latch through one of the legs of the U-spring provided at the other end of the stop latch; and that the free end of the spring may exert a spring force acting substantially perpendicular to the steep side of the pawl, the locking hook being wedged in between the pawl and the free end of the spring.

Due to the use of a stop latch, a trapped animal may not be able to escape either with nor without outside assistance. When the holding means are activated, thus securing the grating and the cover in fixed mutual contact, there is no risk of spreading poison in case poison is used, in the trap. When poison is not used the destruction may easily be carried out, e.g., by means of exhaust gas from a car, provided this method is legal.

Even if an animal inside the trap performs violent movements overturning the trap or in case an animal overturns the trap from outside, the connection means will keep the cover in its place on the receptacle; and moreover, the holding means will keep the grating in its place, and accordingly a trapped animal will not be able to escape.

With the trap of the invention it is possible to obtain an especially simple and inexpensive construction and assembly of the trap as it requires the manufacture and assembly of three elements only, viz. the cover, the grating and the stop latch. Subsequently the cover will be ready for placing on the receptacle. Moreover, this trap will be very easy to use as it is possible to set the trap ready for use by activating the stop latch only in order to disengage the pawl. In this position the spring keeps the grating slightly open. When an animal has entered the trap, the grating will be locked by the movement or later on when the animal tries to escape from the trap as the animal by instinct tries to open the grating by pushing away from itself in the same way as when it entered the trap; accordingly, the pawl is engaged behind the locking hook and the locking hook is wedged by the free leg of the spring. Accordingly, the grating is closed securely and it may only be opened when the stop latch is activated from outside the trap.

DESCRIPTION OF THE DRAWINGS

The invention will be explained in more detail with reference to the accompanying drawing, wherein.

DETAILED DESCRIPTION OF THE PREFERRED EMBODIMENTS

Figure 1:
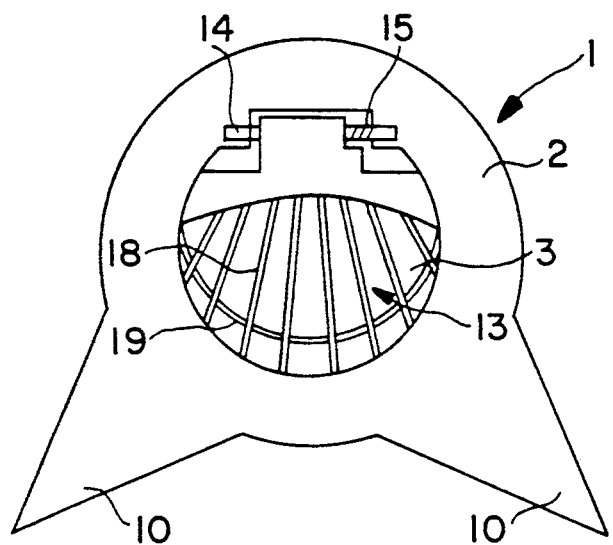
FIG. 1 is a view of a cover forking part of a trap according to the present invention and illustrated as seen from the outside of the trap.
Figure 2:
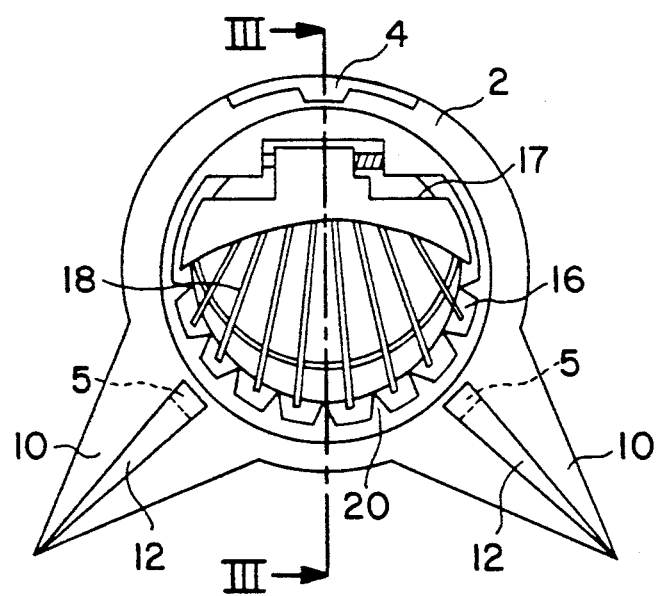
FIG. 2 is a plan view of the cover shown in FIG. 1 illustrated as seen from the opposite side.
Figure 3:
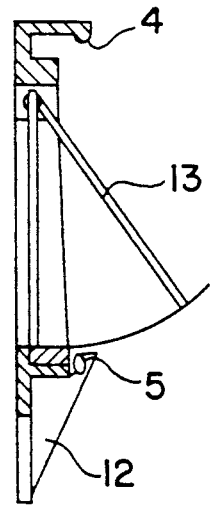
FIG. 3 is a section through the cover shown in FIG. 2.

FIGS. 1-3 illustrate a gate device 1 for a trap according to the invention. For the sake of clarity the stop latch is not illustrated in FIGS. 1-3 and 4-6. The gate device 1 consists of a cover 2 having an entrance opening 3. The cover is provided with connection means consisting of hook-shaped snap acting webs 4,5 intended for resilient engagement with the connection means of the receptacle. As shown in FIG. 6 the receptacle may consist of a household jar 6, having a neck 7 with an entrance opening 8 provided with connection means consisting of a bead or a thread 9 arranged on the neck 7. The cover 2 has two support legs 10 providing a three-point support together with a point 11 of the household jar 6. This provides a solid and secure support for the trap.

As it appears from FIG. 2, two of the snap acting webs 5 are placed opposite the legs 10 of the cover and the webs are extended with ribs 12 standing perpendicular to the cover 2 and evenly tapering outwardly along each associated leg 10. Hereby a lever is provided which may advantageously be used when the webs 5 are released from their engagement with the bead or the thread 9.

Moreover, the cover 2 comprises a grating 13 arranged pivotally about a shaft 14 and biased against a closed position by means of a spring 15. In closed position the grating will be in contact with a contact face 16 consisting of a recessed face of the innerside of the cover. The grating 13 comprises a body portion 17, grating rods 18 and a cross rod 19. The grating rods are in contact with the face 16 arranged between radially orientated protrusions 20. These radially orientated protrusions 20 are intended as a support for an optional further grating mounted as a mirror image thereof; the grating rods of the further grating will be in contact with the ends of the protrusions 20.

The cover 2 may be manufactured from plastic or metal and so may the grating 13. It should be ensured that the materials used are stainless so that they will not corrode when used outdoors and when cleaned.

Figure 5:
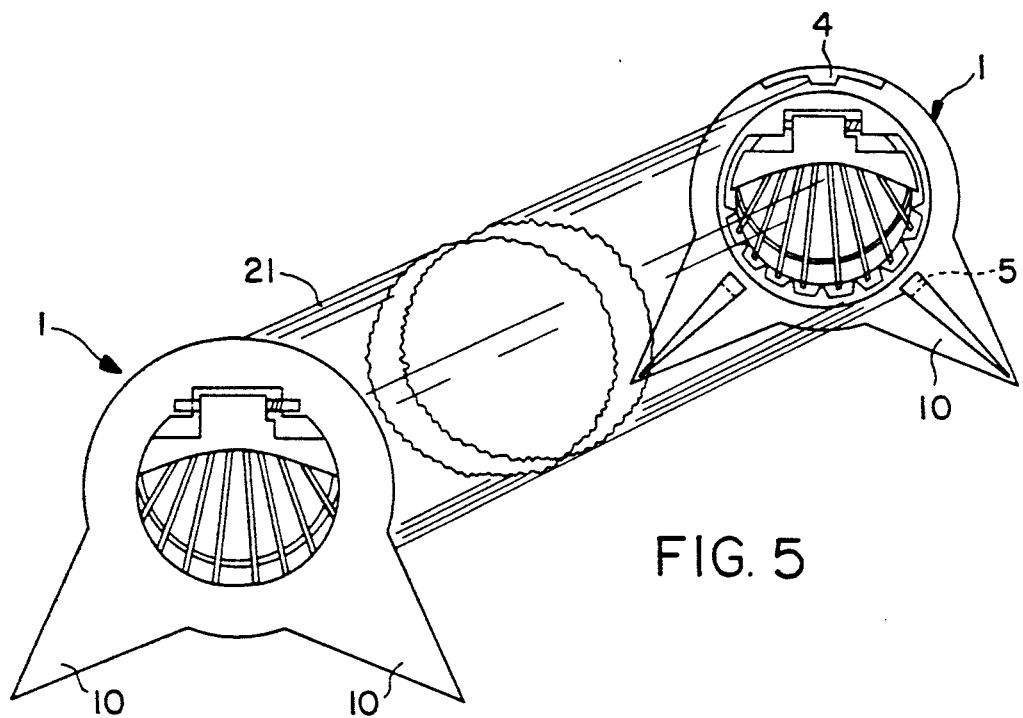
FIG. 5 is a view of a trap according to the invention.
Figure 6:
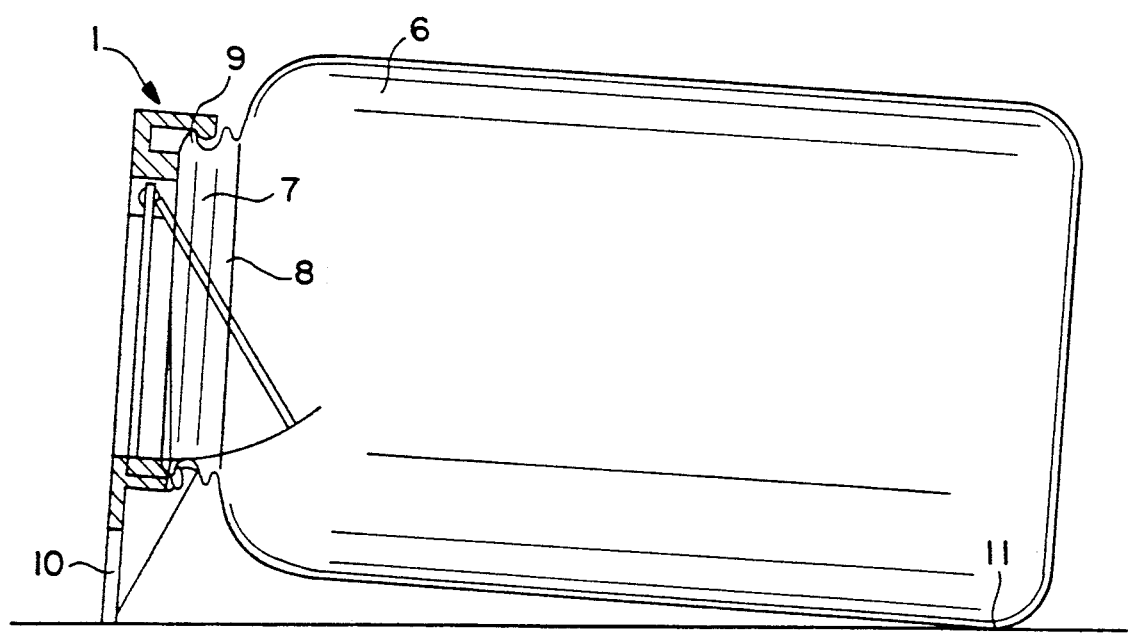
FIG. 6 is a partial section illustrating a further embodiment of the trap.

As shown in FIG. 5 it is also possible to employ a pipe-shaped receptacle 21 for trapping snakes. In each end of this pipe a gate device is provided and accordingly, the trap rests on the four legs of the cover. The connection means (not shown) of the pipe 21 may consist either of notches or protrusions intended for engagement with the snap action webs 4,5.

Figure 4:
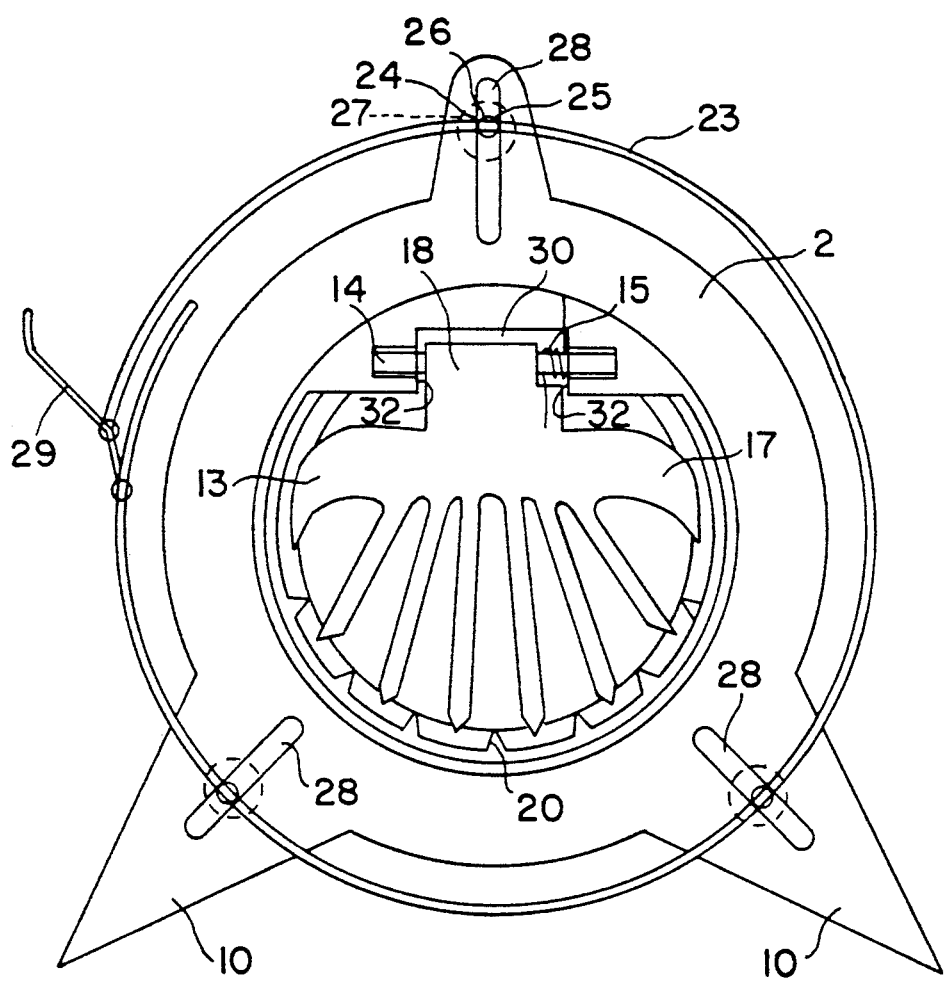
FIG. 4 is a view corresponding to FIG. 1 illustrating a further embodiment of the cover.

FIG. 4 illustrates an embodiment wherein the connection means of the cover consist of a clamp 23. The clamp passes through openings 24 in slide means 25 consisting of a substantially cylindrical shaft 26 provided with two collars 27 intended to be placed on each side of a cover whereby the shaft 26 is mounted slidably in radially extending slots 28 in the cover. The clamp 23 is secured by means of any known clamping handle 29, thus providing a clamping action around the receptacle optionally in engagement behind beads provided around the entrance opening 8 of the receptacle.

According to a further embodiment (not shown) the cover may be secured to the receptacle by means of a patent clamp known, e.g., from jars for preserves. Accordingly, the clamp is provided with an annular groove for securing one part of the patent clamp, whereas the other part of the patent clamp is placed behind a bead provided around the entrance opening of the receptacle. Such patent clamp may be purchased as a standard article adapted to the household jar on the market.

All embodiments illustrated in FIGS. 1-6 may be provided with holding means of the type explained in the following.

Figure 7:
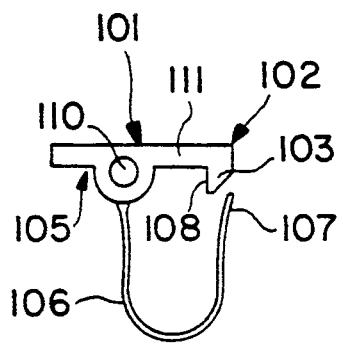
FIGS. 7-10 are views of the holding means consisting of a stop latch illustrated in different positions.

FIGS. 7-10 show a stop latch 101 at the one end 102 of which a serrated pawl 103 is provided. The stop latch is an injection-moulded plastic blank. The serrated pawl is intended for cooperation with a locking hook 104 (see FIGS. 9 and 10). The stop latch comprises a substantially U-shaped flat spring 106, too, which is provided at the same side 105 of the body 111 of the stop latch 101 as the pawl 103. FIG. 7 shows the stop latch in a position wherein the spring 106 is provided in its natural position of rest, i.e., the position wherein the free end 107 of the spring 106 has not yet been placed behind the steep side 108 of the pawl 103.

Figure 8:
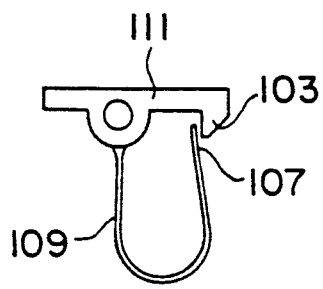
Figure 9:
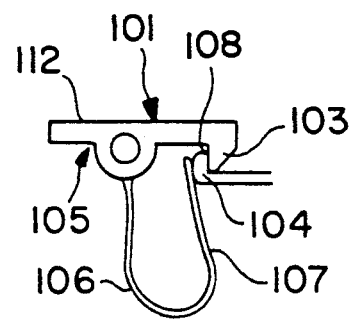

In FIG. 8 the spring 106 is provided under tension as the free end 107 has been placed in contact with the steep side 108 of the pawl 103. In this position the free end 107 of the spring 106 will exert a spring force acting substantially perpendicular to the steep side 108 of the pawl. In this position the stop latch is ready for use. FIG. 9, shows how the locking hook 104 is retained between the steep side 108 of the pawl 103 and the free end 107 of the spring. The locking hook 104 is pinched between these two elements. As it appears from FIG. 9, the U-shaped spring 106 will not only exert a spring force acting substantially perpendicular to the steep side 108 of the pawl, but the spring force will also, as the two legs of the U-spring are not parallel, have a component directed upwards parallel with the steep side of the pawl as shown in the drawing. This ensures particularly safe keeping of the locking hook.

Figure 10:
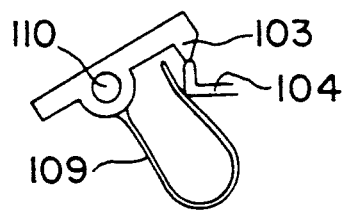

FIG. 10 shows the pawl 103 and the locking hook 104 in their mutual position for engagement/releasing. In this mutual position the free leg 107 of the U-spring is bent inward towards the other leg 109 of the U-spring. Accordingly, the spring is further tensioned and consequently it exerts a force on the locking hook 104, which force is greater than the force exerted by the mutual engagement between the pawl, the locking hook and the spring illustrated in FIG. 9. In case the situation illustrated in FIG. 10 is that of engagement between the pawl and the locking hook, a force is exerted on the locking hook 104 which exceeds the spring force. The stop latch will rotate about its pivot 110 immediately after the locking hook is moved behind the pawl whereby the pawl and the locking hook is brought into engagement. This mutual engagement is secured as the force exerted by the locking hook provides a torque around the pivot 110 of the stop latch 101. Accordingly, the stop latch may be moved into its closed position wherein it may be secured irrespective of the orientation of the stop latch. In the mutual position illustrated in FIG. 10 the spring 106 is under maximum tension as the free leg 107 of the U-spring is bent to its maximum towards the other leg 109 of the U-spring, and accordingly, the component of the U-spring running parallel with the steep side 108 of the pawl 103 will also be at its maximum. This force component contributes to providing a particularly secure engagement between the pawl 103 and the locking hook 104 irrespective of the orientation of the stop latch 101.

In the illustrated embodiment the axis of the pivot 110 is provided in the plane of the side 105 of the stop latch 101 whereon the pawl 103 is situated. Hereby a large momentum is obtained when the locking force is transmitted through the locking hook 104, and simultaneously, the spring force exerted of the free leg 107 when the stop latch is closed acts substantially perpendicular to the steep side 108 of the pawl. In case the central axis of the pivot 110 is positioned in the body 111 of the stop latch 101, the spring force exerted by the free leg 107 would also have a component acting downwards as seen in the drawing. This will reduce the security of the engagement between the pawl 103 and the locking hook 104.

In FIGS. 7-10 and 12-14 the actuating member for the stop latch 101 consists of the other end 112, i.e., the end opposite the one end 102 of the stop latch whereon the pawl is provided. Accordingly the stop latch is pivotal around an axis between the actuating member 112 and the pawl 103. This allows for release of the engagement by exerting a small force only on the actuating member 112, provided the mutual dimensions are suitable.

Figure 11:
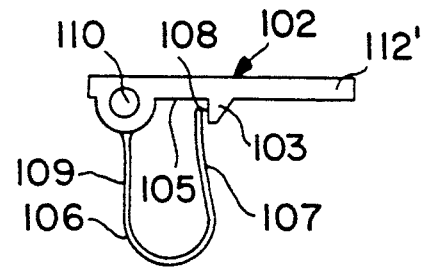
FIG. 11 is a view of a further embodiment of a stop latch.

In FIG. 11 the actuating member 112' of the stop latch is constituted by an extension of the one end 102 of the stop latch beyond the point where the pawl 103 is arranged.

The above-mentioned two embodiments provide a very simple stop latch and the spring 106 permits initial opening of an associated grating once the pawl 103 is released from its engagement with a cooperating locking hook 104.

In the following the stop latch will be described in further details when used in a trap according to the invention.

Figure 12:
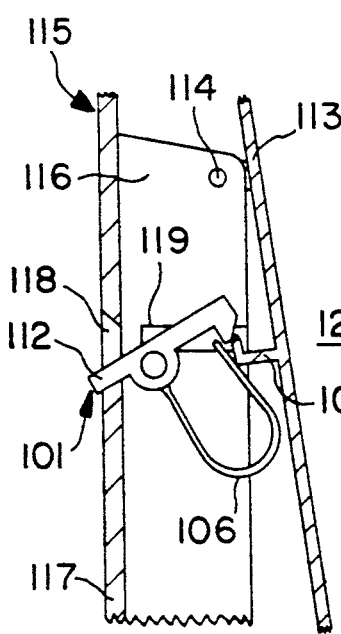
FIGS. 12-14 are partial sections illustrating the stop latch used in a trap according to the invention having the grating in different positions.
Figure 13:
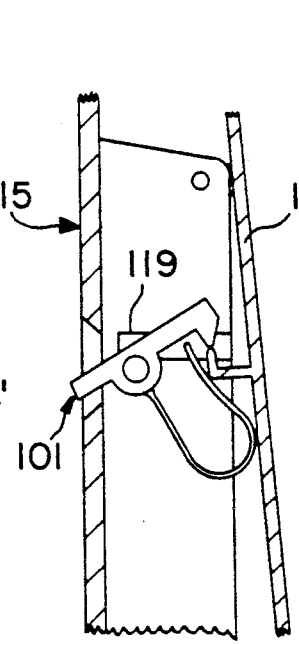
Figure 14:
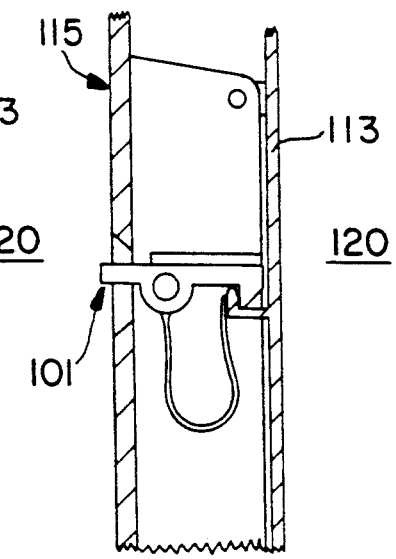

In FIGS. 12-14 a grating 113 is shown which is pivotally connected (at 114) with a cover 115. The cover 115 has an opening (not shown) to be closed by the grating 113 and which is surrounded by a collar 116. In the front side 117 of the cover 115 an opening 118 is provided next to the collar 116; the opening 118 making it possible to actuate the actuating member 112 of the stop latch 101. A mounting groove 119 is provided in the collar 116 and one end of the pivot 110 of the stop latch 101 is situated in the inner part of the mounting groove 119. The grating 113 is provided with a locking hook 104' produced by punching out of the plate constituting the grating 113. In this embodiment the locking mechanism may be protected behind the grating without any risk of an animal present in the trap 120 biting the pawl to pieces. In FIG. 12 the grating 113 is placed ajar, and accordingly, the trap is set to capture animals. The grating remains open as the free end 107 of the spring 106 exerts a force which suffices to obviate the grating from closing due to its own weight. When an animal enters the trap the grating 113 is swung upwards and when subsequently the animal pushes from the inside against the grating the locking hook 104' is brought into engagement behind the pawl 103 as illustrated in FIG. 13. Once this position is crossed the mutual position of the pawl and the locking hook illustrated in FIG. 14 is established. Hereby the animal is captured in the trap and the grating 113 may only be opened by activating the actuating member 112 of the stop latch 101 from outside the trap. Actuating the stop latch 101 from the position illustrated in FIG. 14 makes it possible to set the trap and establish the position illustrated in FIG. 12 wherein the grating 113 is provided in its non-closed position.

I claim:

1. A trap for capturing small animals or reptiles which comprises a transparent receptacle having a neck that defines an entrance mouth and first connecting means, and a cover which is releasably engaged with the receptacle, said cover including:

a frame member which defines an entrance opening, two support legs, and a second connecting means, said second connecting means engaging said first connecting means so as to attach said frame member to said receptacle so that said entrance opening is in communication with said entrance mouth, said frame member defining a contact surface facing said receptacle, a grating member pivotally connected to said frame member so as to move between open and closed positions relative to said entrance opening, said grating member contacting said contact surface when in said closed position, said grating member including a locking hook, and holding means for retaining said grating member in said closed position, said holding means comprising a stop latch provided at one end with a serrated pawl for engagement with said locking hook, said pawl having a steep side, and a substantially U-shaped flat spring having two legs, one of said two legs being connected to said stop latch and a second of said two legs being capable of exerting a spring force perpendicular to said steep side of said pawl and wedging the locking hook against said pawl.

2. A trap according to claim 1, wherein said stop hatch includes a body and is pivotable about an axis of rotation, wherein said serrated pawl extends away from a flat side of said body, wherein said axis of rotation is located in an imaginary plane defined by said flat side, and wherein said first leg of said U-shaped spring is connected to said body adjacent said axis of rotation.

3. A trap according to claim 1, wherein the steep side of the pawl and the part of the locking hook intended for engaging with the pawl each is of such extension that the free leg of the U-spring is bent inward towards the fixed leg of the U-spring when the pawl and the locking hook are provided in their mutual position for engagement/releasing, whereby the locking hook is biased by the spring with a force exceeding the force exerted during mutual engagement between the pawl and the locking hook.

4. A trap according to claim 3, wherein the distance between the stop latch body, whereto the spring and the pawl are mounted, and the contact point between the locking hook and the free leg of the U-spring, pawl and locking hook being provided in their mutual position for engagement/releasing, is greater than the distance between said body to the axis of rotation for the stop latch.

5. A trap according to claim 1, wherein the connecting means of the cover consist of a number of L-shaped or hook-shaped webs intended for resilient snap-action engagement with the connecting means of the receptacle, generally provided in the form of a thread or beads, wherein two of said webs are arranged opposite the legs of the cover standing perpendicular thereto and extending outwards along the legs to form a lever to be used when releasing the engagement of said two webs.

6. A trap according to claim 1, wherein the connecting means of the cover consist of a clamp passing through holes in pins arranged in slots in the cover for radially displacing; said clamp is clamped by means of a toggle joint clamping handle.

* * * * *

UNITED STATES PATENT AND TRADEMARK OFFICE
CERTIFICATE OF CORRECTION

PATENT NO. : 5,067,271

DATED : November 26, 1991

INVENTOR(S) : Henning Joergensen

It is certified that error appears in the above-identified patent and that said Letters Patent is hereby corrected as shown below:

ON THE TITLE PAGE:

[76] Inventor:  Henning Joergensen, Noerrehald 4
                Ebeltoft, Denmark Item [19] should read --Joergensen--.

Signed and Sealed this

Second Day of March, 1993

*Attest:*

STEPHEN G. KUNIN

*Attesting Officer*   Acting Commissioner of Patents and Trademarks